US009405157B2

(12) United States Patent
Oh et al.

(10) Patent No.: US 9,405,157 B2
(45) Date of Patent: Aug. 2, 2016

(54) LIQUID CRYSTAL DISPLAY

(71) Applicant: Samsung Display Co., Ltd., Yongin, Gyeonggi-do (KR)

(72) Inventors: Ho Kil Oh, Yongin-si (KR); Cheol Shin, Hwaseong-si (KR); Ka Eun Kim, Yongin-si (KR); Hyo Ju Jung, Incheon (KR); Ki Chul Shin, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 132 days.

(21) Appl. No.: 14/274,123

(22) Filed: May 9, 2014

(65) Prior Publication Data

US 2015/0116641 A1   Apr. 30, 2015

(30) Foreign Application Priority Data

Oct. 25, 2013 (KR) .................. 10-2013-0128079

(51) Int. Cl.
*G02F 1/1337* (2006.01)
*G02F 1/1343* (2006.01)

(52) U.S. Cl.
CPC .... *G02F 1/134336* (2013.01); *G02F 1/133707* (2013.01); *G02F 2001/134318* (2013.01); *G02F 2001/134345* (2013.01)

(58) Field of Classification Search
CPC ............... G02F 1/134336; G02F 1/133707; G02F 2001/134318; G02F 2001/134345
USPC ......................................................... 349/129
See application file for complete search history.

(56) References Cited

U.S. PATENT DOCUMENTS 7,145,622 B2 * 12/2006 Kataoka ............ G02F 1/133707
349/130
7,342,629 B2 * 3/2008 Yoshida ............ G02F 1/133555
349/113
7,518,685 B2   4/2009 Kim et al.
8,102,493 B2   1/2012 Li et al.
8,325,306 B2   12/2012 Nakanishi et al.
8,330,921 B2 * 12/2012 Tsao ................. G02F 1/133707
349/129
2004/0218128 A1 * 11/2004 Matsuyama .......... G02F 1/1393
349/123
2007/0070273 A1 * 3/2007 Yoshida ............ G02F 1/133555
349/114
2012/0105786 A1   5/2012 Iwamoto et al.
2012/0133872 A1 * 5/2012 Kim ................. G02F 1/133707
349/128
2012/0223931 A1   9/2012 Tashiro et al.
2014/0267994 A1   9/2014 Ryu et al.

FOREIGN PATENT DOCUMENTS

JP         11-109358      4/1999
KR         10-0813349     3/2008
KR         10-2014-0113035 9/2014

* cited by examiner

*Primary Examiner* — Nathanael R Briggs
(74) *Attorney, Agent, or Firm* — H.C. Park & Associates, PLC (57) ABSTRACT

A liquid crystal display, including a lower panel electrode including at least one lower panel unit electrode, an upper panel electrode including at least one upper panel unit electrode facing the at least one lower panel unit electrode, and a liquid crystal layer disposed between the lower panel electrode and the upper panel electrode, wherein the lower panel unit electrode includes a stem part forming borders between a plurality of sub-regions; a center pattern including a plurality of straight line sides respectively disposed at the plurality of sub-regions, and a plurality of fine branch parts extending out from the center pattern, the stem part includes a horizontal stem part and a vertical stem part, and angles that the horizontal stem part and the vertical stem part form with the respective straight line sides of the center pattern are different from each other.

19 Claims, 8 Drawing Sheets

LIQUID CRYSTAL DISPLAY

CROSS-REFERENCE TO RELATED APPLICATION

This application claims priority from and the benefit of Korean Patent Application No. 10-2013-0128079, filed on Oct. 25, 2013, which is hereby incorporated by reference for all purposes as if fully set forth herein.

BACKGROUND

1. Field

Exemplary embodiments of the present invention relate to a liquid crystal display.

2. Discussion of the Background

A liquid crystal display is currently one of the most widely used flat panel displays, and includes two display panels on which electric field generating electrodes such as a pixel electrode and a common electrode are formed, and a liquid crystal layer interposed between the two display panels. The liquid crystal display displays an image by generating an electric field on a liquid crystal layer by applying a voltage to the field generating electrodes, determining alignments of liquid crystal molecules of the liquid crystal layer through the generated field, and controlling polarization of incident light.

Among the liquid crystal displays, a vertically aligned mode liquid crystal display, in which liquid crystal molecules are aligned so that long axes thereof are perpendicular to the upper and lower panels while the electric field is not applied, has been in the limelight because its contrast ratio is high and a wide reference viewing angle can easily be implemented.

In order to implement a wide viewing angle in a vertically aligned mode liquid crystal display, a plurality of domains with different alignment directions of the liquid crystal may be formed in one pixel.

As means of forming the plurality of domains, a method of forming cutouts such as minute slits on the field generating electrode is used. According to this method, the plurality of domains may be formed by rearranging the liquid crystal molecules using a fringe field formed between edges of the cutouts and the field generating electrodes facing the edges thereof.

For example, liquid crystal displays having a domain-forming member may include a VA mode liquid crystal display that includes domain-forming members formed at both the upper and lower substrates, and a patternless VA mode liquid crystal display having minute patterns formed only at a lower substrate but not on an upper substrate. A display area is sectored into a plurality of domains by the domain-forming members, and liquid crystal molecules in each domain are generally inclined in the same direction.

Recently, a method for providing a pretilt to the liquid crystal molecules in the absence of an electric field has been developed to improve a response speed of the liquid crystal while providing a wide viewing angle. For the liquid crystal molecules to have the pretilt towards various directions, an alignment layer having various aligning directions may be used, or an alignment aid for providing the pretilt to the liquid crystal molecules of the liquid crystal layer is added to be hardened after applying the electric field to the liquid crystal layer. The alignment aid hardened by heat or light such as ultraviolet rays may provide the pretilt to the liquid crystal molecules in a predetermined direction. In this instance, to generate the electric field to the liquid crystal layer, the voltage is applied to the respective electric field generating electrodes.

However, in order to manufacture the liquid crystal display including the alignment aid for providing the pretilt, the alignment aid and the subsequent hardening process using ultraviolet rays may be required, thereby resulting in a new processing line for an additional process and an additional cost. Accordingly, the manufacturing cost of the liquid crystal display is increased, the additional manufacturing equipment is required, and the manufacturing process is complicated.

The above information disclosed in this Background section is only for enhancement of understanding of the background of the invention and therefore it may contain information that does not form any part of the prior art nor what the prior art may suggest to a person of ordinary skill in the art.

SUMMARY

Exemplary embodiments of the present invention provide a liquid crystal display having high side visibility and a wide viewing angle.

Additional features of the invention will be set forth in the description which follows, and in part will be apparent from the description, or may be learned by practice of the invention.

An exemplary embodiment of the present invention discloses a liquid crystal display, including a lower panel electrode including at least one lower panel unit electrode, an upper panel electrode including at least one upper panel unit electrode facing the at least one lower panel unit electrode, and a liquid crystal layer disposed between the lower panel electrode and the upper panel electrode, wherein the lower panel unit electrode includes a stem part forming borders between a plurality of sub-regions; a center pattern including a plurality of straight line sides respectively disposed at the plurality of sub-regions, and a plurality of fine branch parts extending out from the center pattern, the stem part includes a horizontal stem part and a vertical stem part, and an angle formed between the horizontal stem part and the respective straight line side of the center pattern, and an angle formed between the vertical stem part and the respective straight line side of the center pattern are different from each other.

The exemplary embodiment of the present invention provides the liquid crystal display capable of being manufactured at a low cost and by simple manufacturing processes, and having the high side visibility and the excellent viewing angle without additional manufacturing equipment.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In the drawings, the thickness of layers, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Hereinafter, a liquid crystal display according to an exemplary embodiment of the present invention will be described with reference to FIGS. 1 to 4.

Figure 1:
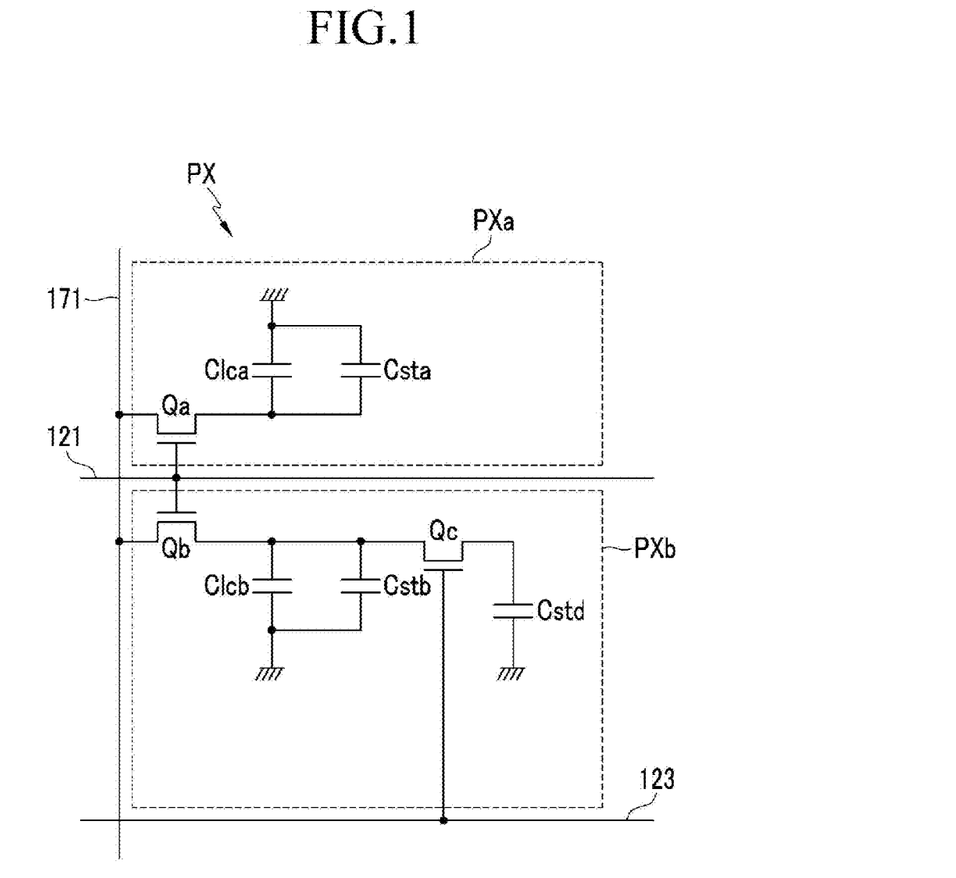
FIG. 1 is an equivalent circuit diagram showing a pixel of a liquid crystal display according to an exemplary embodiment of the present invention.
Figure 2:
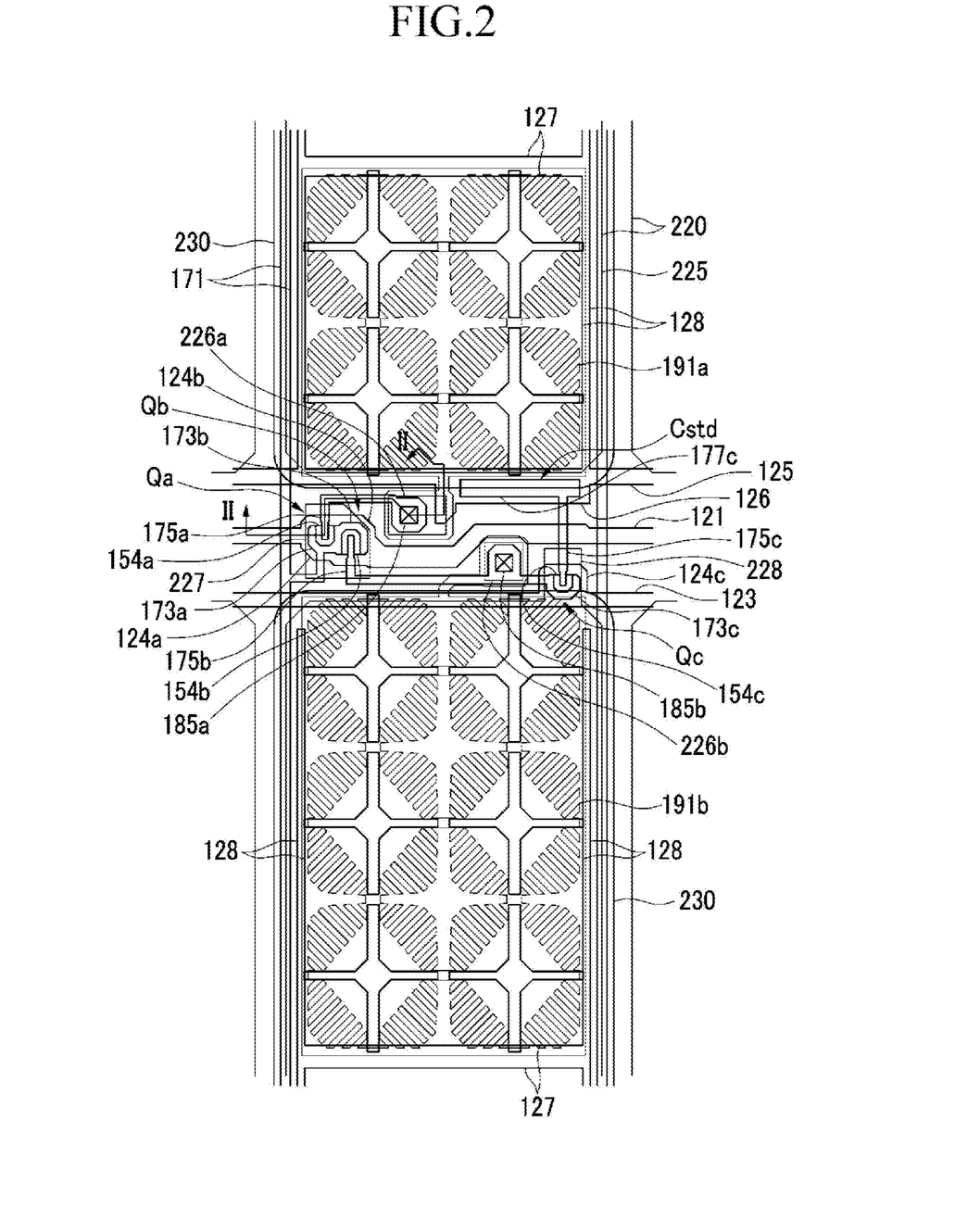
FIG. 2 is a top plan view showing the pixel of a liquid crystal display according to an exemplary embodiment of the present invention.
Figure 3:
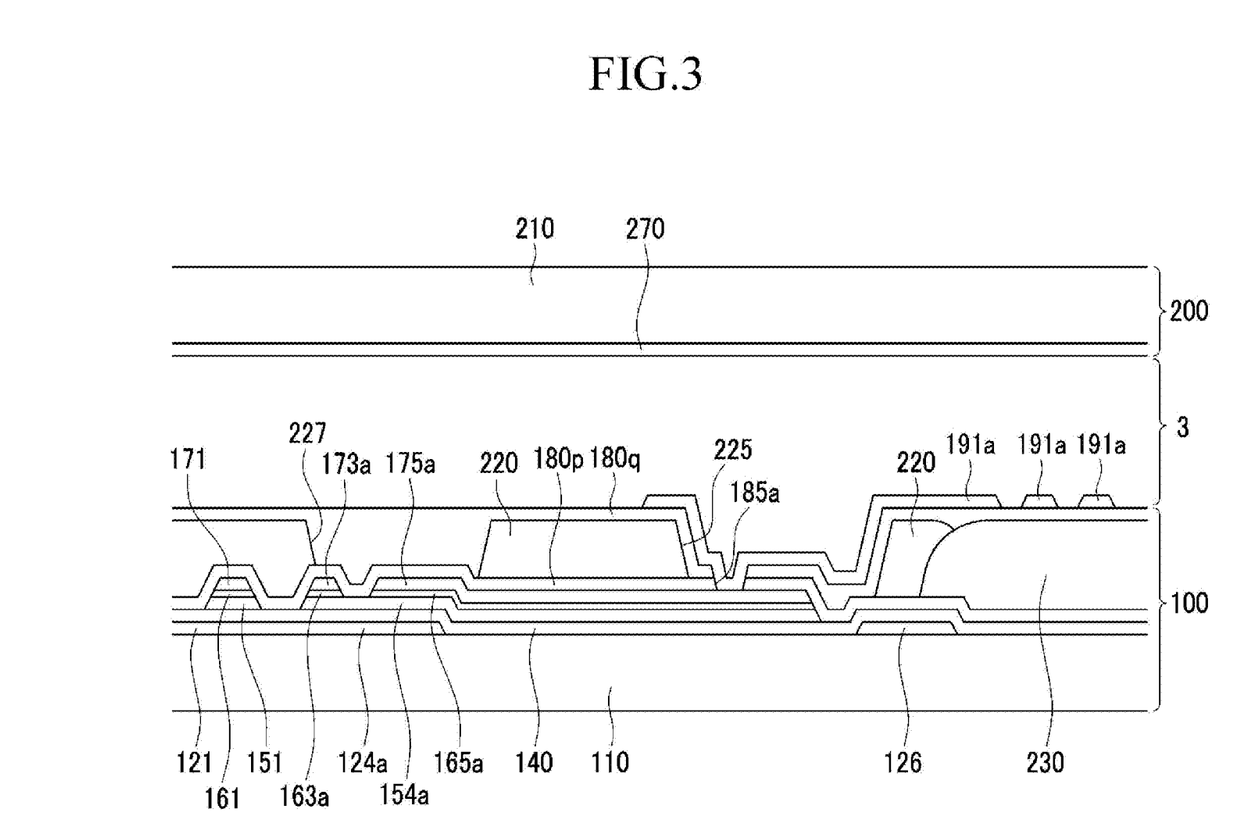
FIG. 3 is a cross-sectional view showing the liquid crystal display of FIG. 2 taken along the line II-II.
Figure 4:
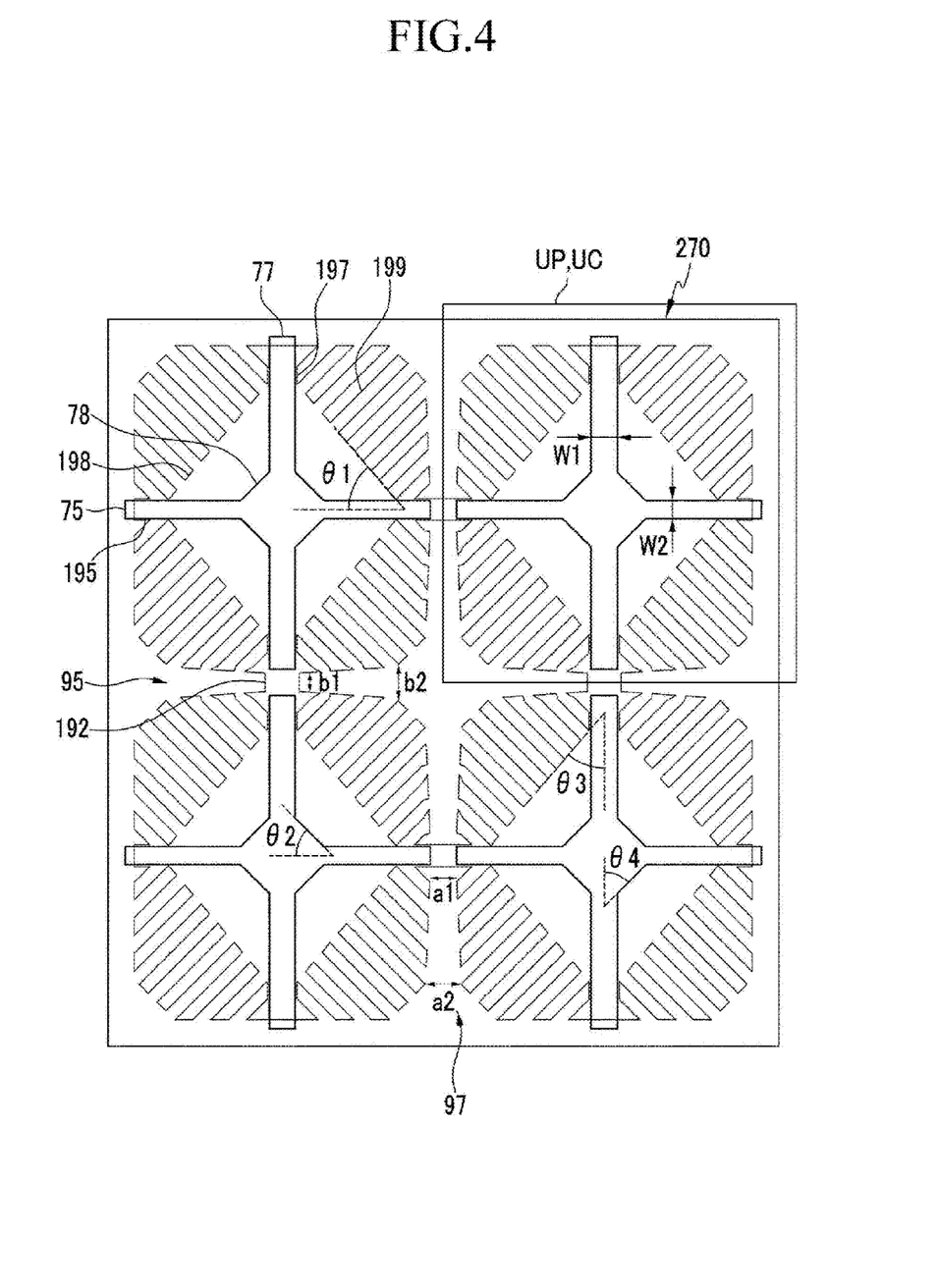
FIG. 4 is a top plan view showing lower and upper panel electrodes of a liquid crystal display according to an exemplary embodiment of the present invention.

FIG. 1 is an equivalent circuit diagram showing a pixel of a liquid crystal display according to an exemplary embodiment of the present invention, FIG. 2 is a top plan view showing a pixel of the liquid crystal display according to an exemplary embodiment of the present invention, FIG. 3 is a cross-sectional view of the liquid crystal display of FIG. 2 taken along the line II-II, and FIG. 4 is a top plan view showing lower and upper panel electrodes of the liquid crystal display according to an exemplary embodiment of the present invention.

Referring to FIG. 1, the liquid crystal display according to an exemplary embodiment of the present invention includes a gate line 121, a step-down gate line 123, a signal line including a data line 171, and a pixel PX connected to the signal line.

Each pixel includes first and second subpixels PXa and PXb. The first subpixel PXa includes a first thin film transistor Qa, a first liquid crystal capacitor Clca, and a first storage capacitor Csta, and the second subpixel PXb includes second and third thin film transistors Qb and Qc, a second liquid crystal capacitor Clcb, a second storage capacitor Cstb, and a step-down capacitor Cstd.

The first and second thin film transistors Qa and Qb are respectively connected to the gate line 121 and the data line 171, and the third thin film transistor Qc is connected to the step-down gate line 123.

More specifically, the thin film transistors Qa and Qb may be three-terminal elements. The control terminals of the thin film transistors Qa and Qb may be connected to the gate lines 121. The input terminals of the thin film transistors Qa and Qb may be connected to the data lines 171. And the output terminals of the thin film transistors Qa and Qb may each be connected to the first liquid crystal capacitor Clca and the first storage capacitor Csta, and the second liquid crystal capacitor Clcb and the second storage capacitor Cstb, respectively.

The third thin-film transistor Qc may also be a three-terminal element of a thin film transistor, including a control terminal connected to the step-down gate line 123, an input terminal connected to the second liquid crystal capacitor Clcb, and an output terminal connected to the step-down capacitor Cstd.

The step-down capacitor Cstd is connected to the output terminal of the third switching element Qc and a common voltage.

An operation of the pixel PX will now be described. First, a gate-on voltage Von is applied to the gate line 121 and the first and second thin film transistors Qa and Qb connected thereto are turned on. A gate-off voltage Voff is applied to the step-down gate line 123.

Accordingly, the data voltage of the data line 171 is applied to the first and second liquid crystal capacitors Clca and Clcb through the turned-on first and second switching elements Qa and Qb and the first and second liquid crystal capacitors Clca and Clcb are charged with a difference between the data voltage Vd and the common voltage Vcom.

Next, the gate off voltage Voff is applied to the gate line 121 and the gate-on voltage Von is applied to the step-down gate line 123 simultaneously, thereby turning off the first and second thin film transistors Qa and Qb, and turning on the third thin film transistor Qc. Therefore, a charging voltage of the second liquid crystal capacitor Clcb connected with the output terminal of the second thin film transistor Qb may be dropped. Accordingly, in an exemplary embodiment of the liquid crystal display driven by frame inversion, the charging voltage of the second liquid crystal capacitor Clcb may be lower than a charging voltage of the first liquid crystal capacitor Clca, and the visibility of the liquid crystal display may be improved by differentiating the charge voltages of the first and second liquid crystal capacitors Clca and Clcb.

Referring to FIGS. 2 and 3, the liquid crystal display having the circuit structure illustrated in FIG. 1 according to an exemplary embodiment of the present invention will be described. Therefore, like reference numerals are used to denote like elements, and the repeated description will be omitted.

FIG. 2 is a top plan view of one pixel of a liquid crystal display according to an exemplary embodiment of the present invention, and FIG. 3 is a cross-sectional view of the liquid crystal display of FIG. 2 taken along line II-II.

The liquid crystal display according to the exemplary embodiment of the present invention includes lower and upper display panels 100 and 200 facing each other, and a liquid crystal layer 3 interposed between the two display panels 100 and 200.

First, the lower display panel 100 will be described. A plurality of gate conductors including the gate line 121, the step-down gate line 123, and a storage electrode line 125 are formed on an insulating substrate 110. The gate line 121 and the step-down gate line 123 may mainly be extended in a horizontal direction, and transmit a gate signal. The gate line 121 may include a first gate electrode 124a and a second gate electrode 124b, and the step-down gate line 123 may include a third gate electrode 124c. The first and second gate electrodes 124a and 124b are connected with each other. The storage electrode line 125 may be extended in the horizontal direction, and transmit a predetermined voltage such as the common voltage Vcom. The storage electrode line 125 may include a storage extension portion 126, a pair of vertical portions 128 approximately extended upwards to be perpendicular to the gate line 121, and a horizontal portion 127 connecting the pair of vertical portions 128, but the structure of the storage electrode line 125 is not limited thereto.

A gate insulating layer 140 is positioned on the gate conductor, and a semiconductor 151 is positioned on the gate insulating layer 140. The semiconductor 151 may mainly extend in a vertical direction, and includes first and second semiconductors 154a and 154b extended toward the first and second gate electrodes 124a and 124b and connected with each other, and a third semiconductor 154c connected with the second semiconductor 154b.

An ohmic contact 161 is formed on the semiconductor 151, ohmic contacts 163a and 165a are formed on the first semiconductor 154a, and ohmic contacts may also be formed on the second semiconductor 154b and the third semiconductor 154c, respectively. However, the ohmic contacts 163a and 165a may be omitted.

A data conductor including the data line 171, a first drain electrode 175a, a second drain electrode 175b, and a third drain electrode 175c may be formed on the ohmic contacts 163a and 165a. The data line 171 may include a first source electrode 173a and a second source electrode 173b extended toward the first gate electrode 124a and the second gate electrode 124b. Rod-shaped end portions of the first drain electrode 175a and the second drain electrode 175b are partially surrounded by the first source electrode 173a and the second source electrode 173b, respectively. One wide end of the second drain electrode 175b is extended again to form a third source electrode 173c bent in a U-shape. A wide end portion 177c of the third drain electrode 175c overlaps the storage extension portion 126 to form the step-down capacitor Cstd, and a rod-shaped end portion of the third drain electrode 175c is partially surrounded by the third source electrode 173c.

The first, second, and third gate electrodes 124a, 124b, and 124c, the first, second, and third source electrodes 173a, 173b, and 173c, and the first, second, and third drain electrodes 175a, 175b, and 175c form the first, second, and third thin film transistors Qa, Qb, and Qc together with the first, second, and third semiconductors 154a, 154b, and 154c, respectively.

A lower passivation layer 180p is positioned on the data conductors 171, 175a, 175b, and 175c and exposed portions of the semiconductors 154a, 154b, and 154c. A color filter 230 and a light blocking member 220 may be positioned on the lower passivation layer 180p. The light blocking member 220 may include an opening 227 positioned on the first and second thin film transistors Qa and Qb, an opening 226a positioned on the wide end portion of the first drain electrode 175a, an opening 226b positioned on the wide end portion of the second drain electrode 175b, and an opening 228 positioned on the third thin film transistor Qc. Alternatively, at least one among the color filter 230 and the light blocking member 220 may be positioned on the upper display panel 200.

An upper passivation layer 180q is positioned on the color filter 230 and the light blocking member 220. A plurality of contact holes 185a and 185b respectively exposing the first and second drain electrodes 175a and 175b are formed in the lower passivation layer 180p and the upper passivation layer 180q.

A lower panel electrode including a first subpixel electrode 191a and a second subpixel electrode 191b is positioned on the upper passivation layer 180q. Each of the first subpixel electrode 191a and the second subpixel electrode 191b may have a shape as shown in FIG. 4. Particularly, areas of the first and second subpixel electrodes 191a and 192b may be differently configured to improve the side visibility. More specifically, the first subpixel electrode 191a may include four lower panel unit electrodes UP like the lower panel electrode 191 illustrated in FIG. 2 and the second subpixel electrode 191b may include six or eight lower panel unit electrodes UP.

FIG. 2 illustrates an exemplary embodiment in which the first subpixel electrode 191a includes four lower panel unit electrodes UP and the second subpixel electrode 191b includes six lower panel unit electrodes UP. Particularly, according to an exemplary embodiment of the present invention, sides of a center pattern may form different angles respectively. Specifically, the angles formed between the sides of the center pattern of the lower panel unit electrode, and stem parts are different.

According to an exemplary embodiment of the present invention, the angle formed between a horizontal stem part and a side of the center pattern of the lower panel unit electrode may be larger than that formed between a vertical stem part and a side of the center pattern of the lower panel unit electrode. The structure of the exemplary embodiment may provide the display device with an improved side visibility.

The present specification only illustrates an exemplary embodiment that the angle formed between the horizontal stem part and a side of the center pattern of the lower panel unit electrode may be larger than that formed between the vertical stem part and a side of the center pattern of the lower panel unit electrode, but it is not limited thereto, and may further include an exemplary embodiment in which the angle formed between the vertical stem part and a side of the center pattern of the lower panel unit electrode may be larger than that formed between the horizontal stem part and a side of the center pattern of the lower panel unit electrode. Such exemplary embodiment may provide improved viewing angle.

Accordingly, it is possible to improve the side visibility or the viewing angle of the display panel by adopting a structure in accordance with the features that the display device requires.

The first subpixel electrode 191a may receive the data voltage from the first drain electrode 175a through the contact hole 185a, and the second subpixel electrode 191b may receive the data voltage from the second drain electrode 175b through the contact hole 185b.

Next, referring to the upper display panel 200, an upper panel electrode 270 is positioned over an insulating substrate 210.

The upper panel electrode 270 positioned in the respective subpixels PXa and PXb may have the same structure as the upper panel electrode illustrated in FIG. 4.

Particularly, areas of the first and second subpixels PXa and PXb may be differently configured to improve the side visibility. More specifically, the upper panel electrode 270 of the first subpixel PXa may include four upper panel unit electrodes UC like the lower panel electrode 191, and the upper panel electrode 270 of the second subpixel PXb may include six or eight upper panel unit electrodes UC.

FIG. 2 illustrates an exemplary embodiment in which the upper panel electrode 270 of the first subpixel PXa includes four upper panel unit electrodes UC and the upper panel electrode 270 of the second subpixel PXb includes six lower panel unit electrodes UC. Particularly, according to the exemplary embodiment of the present invention, the example in which the plurality of sides may form different angles will be illustrated and described. Specifically, the angles formed between a center opening of the upper panel unit electrode, a horizontal opening a vertical opening of a cross-shaped opening thereof are different.

According to an exemplary embodiment of the present invention, the angle formed between the horizontal opening and the center opening may be larger than that between the vertical opening and the center opening. The structure of the exemplary embodiment may provide the display device with an improved side visibility.

The present specification only illustrates an exemplary embodiment that the angle formed between the center opening and the horizontal opening is larger than the angle between the center opening and the vertical opening, but it is not limited thereto, and may include an exemplary embodiment that the angle formed between the center opening and the vertical opening is larger than that between the center opening and the horizontal opening. Such exemplary embodiment may provide improved viewing angle.

Accordingly, it is possible to improve the side visibility or viewing angle of the display panel by adopting the structure in accordance with the features that the display device requires.

The first sub-pixel electrode 191a, the upper panel electrode 270, and the liquid crystal layer 3 interposed therebetween may form the first liquid crystal capacitor Clca, and the second sub-pixel electrode 191b, the upper panel electrode 270, and the liquid crystal layer 3 interposed therebetween may form the second liquid crystal capacitor Clcb, thereby maintaining the applied voltage even after the first and second thin film transistors Qa and Qb are turned off. Also, the first and second subpixel electrodes 191a and 191b may overlap the storage electrode line 125 to form the first and second storage capacitors Csta and Cstb.

The liquid crystal display according to the present exemplary embodiment may be applied to any exemplary embodiment in which one pixel PX includes the lower panel electrode 191 including a plurality of lower panel unit electrodes UP and the upper panel electrode 270 including a plurality of upper panel unit electrodes UC. The number of lower panel unit electrodes UP and upper panel unit electrodes UC forming one pixel PX may be changed in accordance with the structure and the area of the pixel PX, considering the liquid crystal controlling force.

Although the exemplary embodiment discloses the four lower panel unit electrodes UP connected with each other and the four upper panel unit electrodes UC connected with each other, the present invention is not limited thereto.

Referring to FIG. 4, the plurality of lower panel unit electrodes UP is connected with each other through a connection portion 192. The connection portion 192 may be positioned on an extended line of cross-shaped stem parts 195 and 197 of the lower panel unit electrode UP. A space between adjacent lower panel unit electrodes UP in a column direction, (i.e. the vertical direction) forms a horizontal gap 95, and a space between adjacent lower panel unit electrodes UP in a row direction, (i.e. the horizontal direction) forms a vertical gap 97.

The upper panel unit electrodes UC are connected with each other. Adjacent cross-shaped openings 75 and 77 may be connected with each other in the upper panel unit electrode UC in the row direction and/or the column direction. In the exemplary embodiment, to prevent the upper panel unit electrodes UC of the upper panel electrode 270 from being divided into pieces, end portions of the cross-shaped openings 75 and 77 adjacent to a side of the upper panel electrode 270 may be spaced apart from the side of the upper panel electrode 270 to form the connection portion.

In other words, four sub-regions divided by the cross-shaped openings 75 and 77 in each upper panel unit electrode UC may be connected with each other through the connection portion.

Liquid crystal molecules 31 positioned in the region of the horizontal gap 95 and the vertical gap 97, do not have a fixed inclination direction, and may be inclined in both directions approximately parallel with the extending directions of the horizontal gap 95 or the vertical gap 97. Accordingly, the liquid crystal molecules 31 in the region of the horizontal gap 95 and the vertical gap 97 are controlled in a different direction from that of the sub-region in which a fine branch part 199 of the lower panel electrode 191 is formed. Particularly, when an external pressure is applied to the display panel of the liquid crystal display displaying an image, the arrangement directions of the liquid crystals molecules 31 around the horizontal gap 95 and the vertical gap 97 may become disoriented and thus the liquid crystal molecules 31 collide with each other such that a texture may be generated to show bruising mark because the directions of the liquid crystal molecules 31 around the horizontal gap 95 and the vertical gap 97 are not restored after the external pressure had been removed. In other words, the arrangements of the liquid crystal molecules 31 around the horizontal gap 95 or the vertical gap 97 may affect the neighboring liquid crystal molecules 31 from the external pressure, such that disorientation of the arrangement of the liquid crystals 31 may be transferred to a vicinity of the horizontal gap 95 and the vertical gap 97, spreading the texture, to show bruising mark after the external pressure had been removed. The bruising mark may be worse when the display image has a high grayscale.

In order to suppress or promptly remove the bruising from the texture caused by the external pressure, the lower panel electrode may have a shape illustrated in FIG. 4.

Referring to FIG. 4, according to the present exemplary embodiment, the lower panel electrode 191 for one pixel PX includes a center pattern 198 positioned at a center of the cross-shaped stem parts 195 and 197 of each lower panel unit electrode UP.

When the center pattern 198 has a rhombus shape, each side of the center pattern 198 may form an oblique angle with the cross-shaped stem parts 195 and 197. Also, the side of the center pattern 198 may form a right angle with a direction to which the fine branch part 199 extends.

As described above, the center pattern 198 with sides may be formed at the center portion of the cross-shaped stem parts 195 and 197 of each lower panel unit electrode UP to enhance the liquid crystal controlling force from a fringe field formed by the side of the center pattern 198 affecting to the vicinity of the horizontal gap 95 or the vertical gap 97. Therefore, it is possible to easily remove or suppress the bruising mark from the texture after the external pressure has been removed.

Moreover, the angles between the plurality of sides of the central pattern 198, and the stem parts 195 and 197 may be different from each other. Specifically, according to an exemplary embodiment of the present invention, the angles formed between the sides of the center pattern 198 and the horizontal stem part 195 may be larger than the angles formed between the sides of the center pattern 198 and the vertical stem part 197. The angles $\theta 1$ formed between the sides of the center pattern 198 and the horizontal stem part 195 may be more than 45 degrees and less than or equal to 50 degrees. In order to control the liquid crystal molecules, an asymmetric structure having the angle more than 45 degrees is desirable. However, the transmittance decreases when the angle $\theta 1$ exceeds 50 degrees. Accordingly, the angles $\theta 3$ formed between the sides of the center pattern 198 and the vertical stem part may be more than or equal to 40 degrees and less than 45 degrees.

In other words, the side visibility of the display panel may be improved by forming the rhombus-shaped central pattern 198 wherein the rhombus-shape has a vertical diagonal length longer than a horizontal diagonal length. According to the structure of the exemplary embodiment described above, the angle of the liquid crystal molecules by the fine branch part approximates the angle of the horizontal stem part, zero degrees. When the angles formed between the sides of the center pattern 198 and the horizontal stem part are 50 degrees, the angles formed between the liquid crystal molecules and the horizontal stem part become 40 degrees, thus the side visibility may be improved.

The present specification illustrates the rhombus shaped central pattern 198 with the vertical diagonal length longer than the horizontal diagonal length, but it is not limited thereto. The horizontal diagonal length may be longer than the vertical diagonal length. According to such exemplary embodiment, the viewing angle may be improved.

According to the exemplary embodiment, the angles formed between sides of the central pattern 198 and the vertical stem part 197 may be more than 45 and less than or equal to 50 degrees. Therefore, the angles $\theta 1$ formed between the sides of the center pattern 198 and the horizontal stem part 195 may be more than or equal to 40 and less than 45 degrees. Thus, the vertical diagonal length may be longer than the horizontal diagonal length, and the viewing angle of the display device may be improved.

The center pattern 198 described above may have different shape for each pixel.

According to an exemplary embodiment, the angles formed between the sides of the center pattern and the horizontal stem part may be larger than the angles formed between the sides of the center pattern and the vertical stem part for both the first and second subpixels Pxa and Pxb. In this exemplary embodiment, both the first and second subpixels Pxa and Pxb may have improved control of liquid crystal molecules from mitigating image blurs and thus have improved the side visibility in.

According to another exemplary embodiment, the angles formed between the sides of the center pattern 198 and the horizontal stem part 195 may be larger than the angles formed between the sides of the center pattern 198 and the vertical stem part 197 for the first subpixel Pxa, and the angles formed between the sides of the center pattern 198 and the vertical stem part 197 may be larger than or equal to the angles formed between the sides of the center pattern 198 and the horizontal stem part 195 for the second subpixel.

In this exemplary embodiment, the first subpixel may have improved side visibility at a low gray level by mitigating image blurs, and the second subpixel may have an improved viewing angle.

Although the present specification has described the combination described above, it is not limited thereto, and any combination that meets the requirements of the display device may be possible.

The fine stem part 199 of the lower panel unit electrode UP may have maximum length of about 53 μm. When the length of the fine branch part 199 is shortened, the liquid crystal controlling force may be enhanced at the vicinity of the horizontal gap 95 and the vertical gap 97 from the fringe field formed by the end portion of the fine branch part 199.

Since the area for the lower panel unit electrode UP is limited, as the size of the center pattern 198 is increased, the length of the fine branch part 199 is shortened, the effect from the formation of the center pattern 198 overlaps with the effect of the shortened length of the fine branch part 199, further decreasing the bruising mark generated from the external pressure.

The upper panel electrode 270 for one pixel PX according to the present exemplary embodiment may include a center opening 78 positioned at the center portion of the cross-shaped openings 75 and 77 of each upper panel unit electrode UC. For example, the center opening 78 may have a rhombus shape, and each side of the center opening may have an oblique angle with respect to the extending direction of the cross-shaped stem parts 195 and 197. More specifically, extending directions of the side of the center opening 78 and the fine branch portion 199 may approximately form a right angle.

According to the exemplary embodiment, when the upper panel electrode 270 includes the center opening 78, the fringe field formed by the side of the center opening 78 may influence the vicinity of the horizontal gap 95 and the vertical gap 97, thereby enhancing the liquid crystal controlling force. Accordingly, it is possible to remove or suppress the bruising mark due to the texture even after the external pressure had been removed.

According to an exemplary embodiment, one diagonal length of the center opening 78 may be longer than another diagonal length, as an example. In other words, sides of the center opening 78 forms different angles between the horizontal opening 75 and the vertical opening 77. For example, the angle formed between the horizontal opening 75 and the center opening 78 may be larger than the angle formed between the vertical opening 77 and the center opening 78. In case of the center opening 78 having a rhombus shape, the horizontal diagonal line is shorter than the vertical diagonal line.

Specifically, according to an exemplary embodiment of the present invention, the angle $\theta 2$ formed between the center opening 78 and the horizontal opening 75 may be larger than the angle $\theta 4$ formed between the center opening 78 and the vertical opening 77. The angle $\theta 2$ formed between the center opening 78 and the horizontal opening 75 may be more than 45 degrees and less than or equal to 50 degrees. This is because transmittance may decrease as the angle $\theta 2$ exceeds 50 degrees. Accordingly, the angle $\theta 4$ between the center opening 78 and the vertical opening 77 may be more than or equal to 40 degrees and less than 45 degrees. In an exemplary embodiment, that the center opening 78 has an asymmetric structure, the side visibility may be improved because the liquid crystal controlling force to a zero degree direction is enhanced.

The present specification illustrates the center opening 78 with the horizontal diagonal length longer than the vertical diagonal length, but it is not limited thereto, and may further provide the center opening 78 with the vertical diagonal length shorter than the horizontal diagonal length. In such exemplary embodiment, the display device may have improved viewing angle as described above in the lower panel unit electrode.

In summary, the liquid crystal controlling force may be enhanced by mitigating image blurs in a low gray level when the center opening 78 forms a larger angle with the horizontal opening 75 than with the vertical opening 77, while the viewing angle may be improved when the center opening 78 forms a larger angle with the vertical opening 77 than with the horizontal opening 75, thereby structure may be designed flexibly in accordance with the features the display panel requires.

Although the present specification illustrates an exemplary embodiment that the center opening 78 of the upper panel unit electrode corresponds to the center pattern of the lower panel unit electrode, it is not limited thereto.

At least one of the center pattern of the lower panel unit electrode and the center opening of the upper panel unit electrode may have the asymmetric rhombus shape.

The upper panel unit electrode includes the center opening 78 and the cross-shaped openings 75 and 77. The cross-shaped openings 75 and 77 include the horizontal opening 75 and the vertical opening 77. The horizontal opening 75 corresponds to the horizontal stem part of the lower panel unit electrode, while the vertical opening 77 corresponds to the vertical stem part of the lower panel unit electrode.

According to an exemplary embodiment, the width W1 of the vertical opening 77 may be larger than the width W2 of the horizontal opening 75. For example, the width W1 of the vertical opening may be 4 μm, while the width W2 of the horizontal opening may be 3.5 μm. However, the width of the openings 75 and 77 are not limited to the widths described above, and may have any range as long as they have asymmetric opening widths. According to the exemplary embodiment, the cross-shaped openings 75 and 77, the side visibility may be improved from strengthening of the fringe field which controls the liquid crystal molecules to a zero degree direction.

At least one of the four corners of the respective lower panel unit electrode UP may be chamfered. Referring to FIG. 4, an exemplary embodiment of the present invention provides that all four corners of the respective lower panel unit electrode UP are chamfered. However, the corners of the respective lower panel unit electrodes UP in the center part of the lower panel electrode 191 may not be chamfered.

The length of the chamfered corners may be about 10 μm to about 15 μm, but it is not limited thereto.

According to the exemplary embodiment, when the corners of the lower panel unit electrodes UP are chamfered, the end portion of the fine branch part 199 may shorten the length of the relatively long fine branch part 199. Accordingly, the influence of the fringe field generated at the end portion of the shortened fine branch part 199 may be well transferred to the vicinity of the horizontal gap 95 and the vertical gap 97, thereby enhancing the liquid crystal controlling force. Also, since the end portion of the fine branch parts 199 at the chamfered corner form oblique angle with the horizontal stem part 195 and the vertical stem part 197, thereby enhancing the liquid crystal controlling force in a direction approximately parallel with the extending direction of the fine branch part 199. Accordingly, it is possible to further prevent or promptly remove the bruising due to the external pressure.

The horizontal gap 95 and the vertical gap 97 of the lower panel electrode 191 may have the different shape. According to an exemplary embodiment, the corner of the horizontal gap 95 or the vertical gap 97 may be not parallel but form oblique line with respect to the horizontal direction or the vertical direction, to form the oblique angle.

In other words, the width of the horizontal gap 95 and the vertical gap 97 is not fixed, and may be changed depending on its position.

Specifically, the width of the horizontal gap 95 and the vertical gap 97 may be smallest in the vicinity of the connection portion 192 and the width may be increased away from the connection portion 192. Accordingly, the width of the horizontal gap 95 and the vertical gap 97 may be decreased closer to the cross-shaped stem parts 195 and 197, and may be increased closer to the corner of the lower panel unit electrode UP.

Accordingly, the width of the horizontal gap 95 and the vertical gap 97 may be maximum at the center portion of the lower panel electrode 191, which is the center portion at which four of the lower panel unit electrodes UP meet, and at the corners of the lower panel unit electrode UP. Also, the width of the horizontal gap 95 and the vertical gap 97 may be maximum at the vicinity of the edge of the lower panel electrode 191.

As described above, when the corners of the horizontal gap 95 and the vertical gap 97 of the lower panel electrode 191 are tilted, the liquid crystal molecules 31 positioned at the region of the horizontal gap 95 and the vertical gap 97 may be tilted in a direction not parallel with the horizontal direction and the vertical direction. Accordingly, the liquid crystal molecules 31 in the vicinity of the horizontal gap 95 and the vertical gap 97 are controlled to be arranged towards a direction approximate to the extending direction of the adjacent fine branch portion 199, thereby decreasing the texture thereat. Therefore, it is possible to suppress the bruising mark left after the external pressure had been applied, or promptly remove the bruising mark.

The width of the vertical gap 97 may be different from that of the horizontal gap 95.

According to the exemplary embodiment of the present invention, the width of the vertical gap 97 is larger than that of the horizontal gap 95, and such asymmetric structure increases the fringe field for controlling the liquid crystal molecules.

Specifically, the widths a1 and a2 of the vertical gap 97 are larger than the widths b1 and b2 of the horizontal gap 95. For example, a1 and a2 may respectively be 4 μm and 7 μm, b1 may be 3.5 μm, and b2 may be 6 μm. However, the widths of the gaps are not limited thereto, and may have any range as long as they enhance the liquid crystal controlling force and have asymmetric values.

Although the present specification illustrates only an exemplary embodiment that the vertical gap is larger than the horizontal gap, it is not limited thereto, and the horizontal gaps b1 and b2 may be larger than the vertical gaps a1 and a2. The liquid crystal molecules may be easily controlled by improving bumps when the vertical gap is larger than the horizontal gap, and the viewing angle may be improved when the horizontal gap is larger than the vertical gap.

Although present specification illustrates that the first and second subpixels equally have asymmetric structures, (angles, widths of gaps, etc.), it is not limited thereto, and in a structure having a plurality of subpixels, at least one subpixel may have an asymmetric structure.

Accordingly, it is possible to meet the requirements of the display device by adopting the asymmetric gap structures described above.

According to the exemplary embodiment of the present invention, by forming the cross-shaped openings 75 and 77 facing the cross-shaped stem parts 195 and 197 of the lower panel electrode 191 in the upper panel electrode 270, the controlling force towards an arrangement direction of the liquid crystal molecules 31 (referred to as a controlling force of the liquid crystal molecules) approximately tilted in parallel with the fine stem part 199 may be strengthened.

Particularly, the controlling force of the liquid crystal molecules 31 may be sufficiently obtained without forming a conventional alignment aid such as alignment layers to provide the pretilt to the liquid crystal molecules 31 to get a fast response speed in the liquid crystal layer 3.

Figure 5:
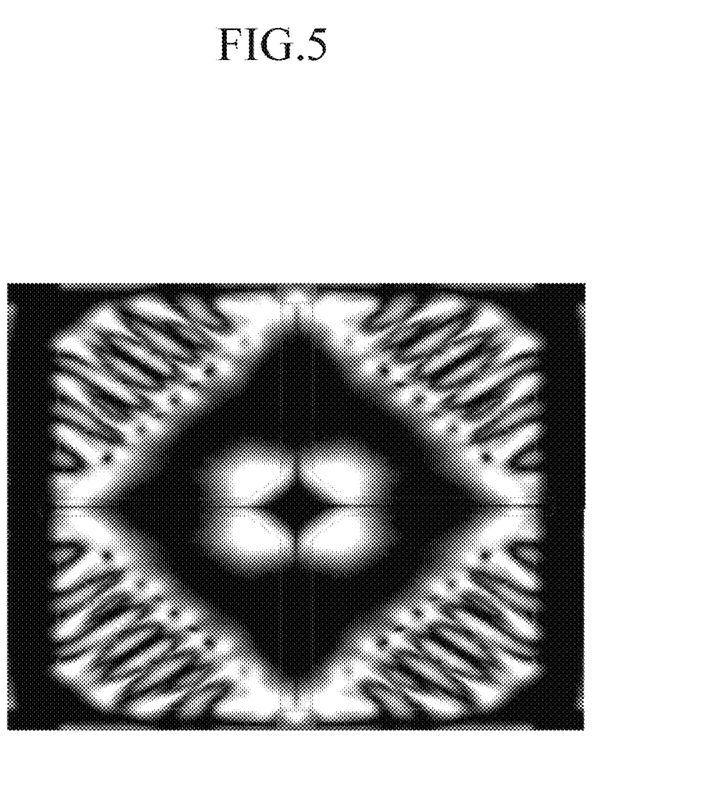
FIGS. 5 and 6 are simulation images showing a simulation result of a liquid crystal display according to an exemplary embodiment of the present invention.
Figure 6:
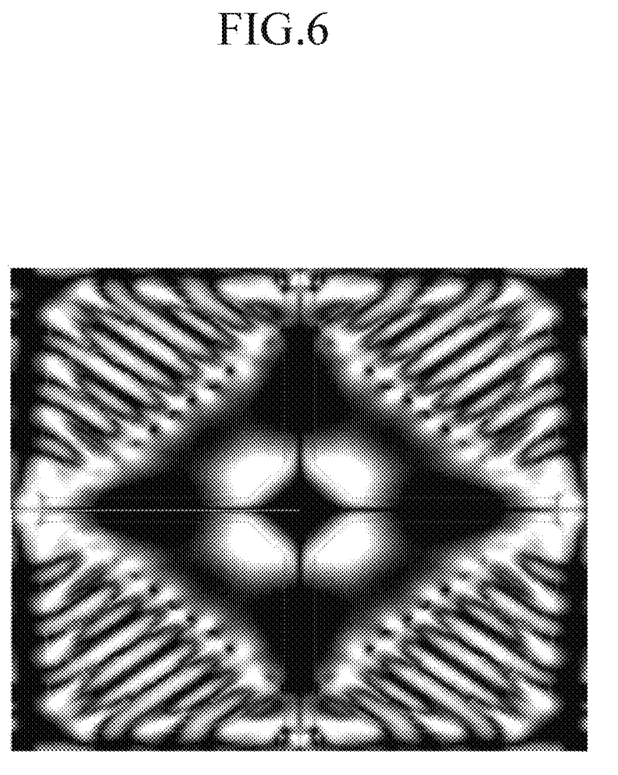

Referring to FIGS. 5 to 6, effects of the angle adjustment described above will be described.

FIG. 5 is a simulation image showing an exemplary embodiment that the angles of the center pattern of the lower panel unit electrode are adjusted. Specifically, FIG. 5 illustrates an exemplary embodiment where the angle formed between the sides of the center pattern and the horizontal stem part is 50 degrees.

FIG. 6 is a simulation image showing an exemplary embodiment that the angles of the center opening of the upper panel unit electrode are adjusted. Specifically, FIG. 6 illustrates an exemplary embodiment where the angle formed between the horizontal opening and the center opening is 50 degrees.

FIG. 5 illustrates the initial movement of the liquid crystal molecules by the lower panel electrode, and the liquid crystal molecules are controlled through the fringe field generated between the center pattern and the fine stem parts. That is, the liquid crystal molecules begin to align at the borders between the center pattern and the fine stem parts. Accordingly, in the exemplary embodiment of the present invention, the angle of the center pattern is adjusted to affect the control of the liquid crystal molecules, thereby improving the visibility.

FIG. 6, on the other hand, illustrates the initial movement of the liquid crystal molecules in the upper panel electrode, and the liquid crystal molecules are initially controlled in the center opening. That is, the liquid crystal begins to align at the borders of the center opening, and thus the shape of the pattern of the center opening is important. Accordingly, similar to the reason described above in FIG. 5, the angle adjustment of the center opening of the upper electrode affects the control of liquid crystal molecules, thereby improving the visibility.

Next, effects of the visibility improvement according to the exemplary embodiment of the present invention will be described with reference to FIGS. 7 and 8.

Figure 7:
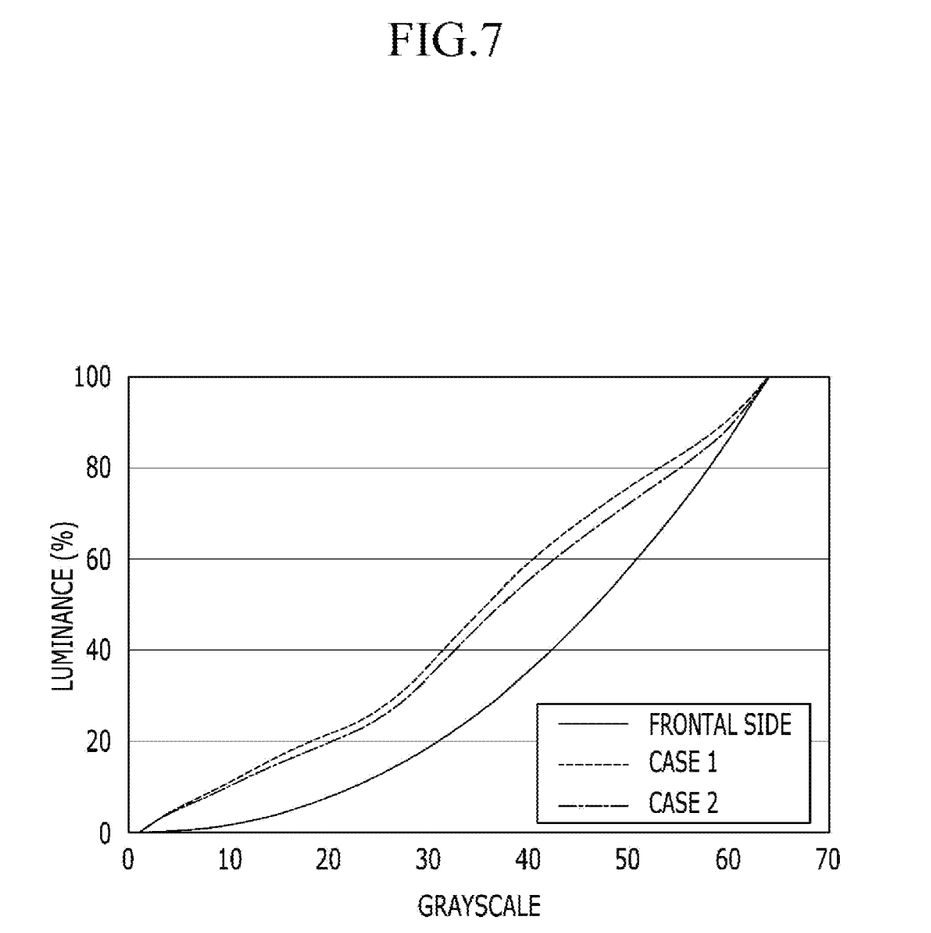
FIG. 7 is a luminance evaluation graph of a liquid crystal display according to an exemplary embodiment of the present invention and a comparative example.
Figure 8:
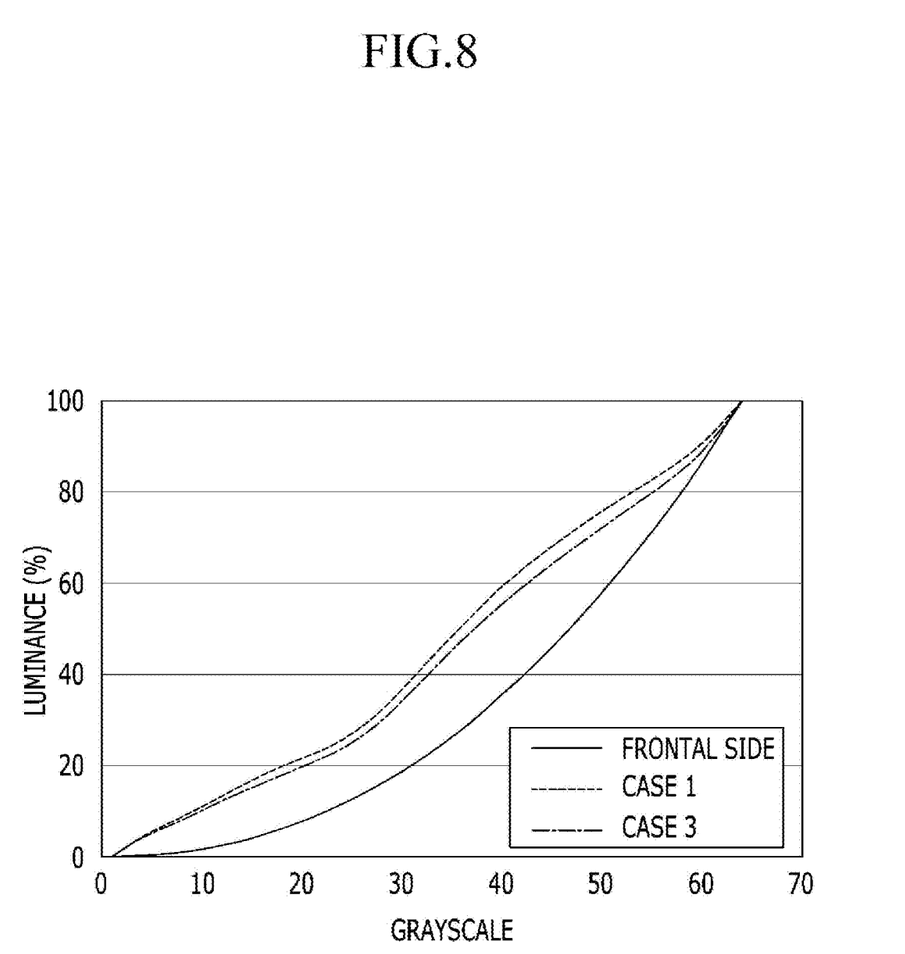
FIG. 8 is a luminance evaluation graph of a liquid crystal display according to another exemplary embodiment of the present invention and a comparative example.

FIG. 7 is a luminance evaluation graph of the liquid crystal display according to the exemplary embodiment of the present invention and a comparative example, and FIG. 8 is a luminance evaluation graph of the liquid crystal display according to another exemplary embodiment of the present invention and a comparative example.

First, referring to FIG. 7, the side visibility shows more or less blurs of images compared with the front visibility. Compared with the case 1 in which the center pattern of the lower panel electrode has a symmetric rhombus shape, the case 2 in which the center pattern of the lower panel electrode has an asymmetric shape and the angles formed between the horizontal stem part and the plurality of corners are 50 degrees shows that the image blurs mitigated. Thus, the visibility may be improved by adjusting the angle of the center pattern of the lower panel electrode, especially when the angles formed between the horizontal stem part and the plurality of sides exceed 45 degrees.

Next, referring to FIG. 8, as described above in FIG. 7, the side visibility shows more or less blurs of images compared with the front visibility. Compared with the case 1 in which the center pattern of the upper panel electrode has a symmetric rhombus shape, the case 3 in which the center pattern of the upper panel electrode has an asymmetric shape and the angle formed between the horizontal opening and the center opening is 50 degrees has mitigated blurs of images. Thus, the visibility may be improved by adjusting the angle of the center pattern of the upper panel electrode, and the visibility may be further improved especially when the angle formed between the horizontal opening and the center opening exceeds 45 degrees.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
   a lower panel electrode comprising at least one lower panel unit electrode;
   an upper panel electrode comprising at least one upper panel unit electrode facing the at least one lower panel unit electrode; and
   a liquid crystal layer disposed between the lower panel electrode and the upper panel electrode, wherein:
   the lower panel unit electrode comprises: a stem part forming borders between a plurality of sub-regions; a center pattern comprising a plurality of straight line sides respectively disposed at the plurality of sub-regions, and a plurality of fine branch parts extending out from the center pattern;
   the stem part comprises a horizontal stem part and a vertical stem part; and
   an angle formed between the horizontal stem part and the respective straight line side of the center pattern is greater than an angle formed between the vertical stem part and the respective straight line side of the center pattern.

2. The liquid crystal display of claim 1, wherein the angle formed between the horizontal stem part and the respective straight line side of the central pattern is greater than 45 degrees and less than or equal to 50 degrees.

3. The liquid crystal display of claim 1, wherein:
   the lower panel electrode comprises a plurality of lower panel unit electrodes; and
   a width of a gap between adjacent lower panel unit electrodes is not uniform.

4. The liquid crystal display of claim 3, wherein at least one corner of the lower panel unit electrode is chamfered.

5. The liquid crystal display of claim 4, wherein the width of the gap increases as it gets closer to the corners of the adjacent lower panel unit electrodes.

6. The liquid crystal display of claim 5, wherein the width of the gap between adjacent lower panel unit electrodes in a row direction is larger than the width of the gap between adjacent lower panel unit electrodes in a column direction.

7. The liquid crystal display of claim 1, wherein the upper panel unit electrode comprises an opening extending in parallel with the stem part.

8. The liquid crystal display of claim 7, wherein the opening comprises:
   a center opening comprising the plurality of straight line sides corresponding to a center pattern of the lower panel unit electrode; and
   a cross-shaped opening corresponding to the stem part.

9. The liquid crystal display of claim 8, wherein:
   the cross-shaped opening comprises a horizontal opening and a vertical opening; and
   an angle formed between the horizontal opening and the respective side of the center opening, and an angle formed between the vertical opening and the respective side of the center opening is different from each other.

10. The liquid crystal display of claim 9, wherein the angle between the horizontal opening and the respective side of the center opening is either about more than or equal to 40 degrees and less than 45 degrees, or more than 45 degrees and less than or equal to 50 degrees.

11. The liquid crystal display of claim 9, wherein the angle formed between the respective side of the center opening and the horizontal opening is larger than the angle formed between the respective side of the center opening and the vertical opening.

12. The liquid crystal display of claim 11, wherein the width of the horizontal opening is narrower than that of the vertical opening.

13. The liquid crystal display of claim 1, wherein a plurality of lower panel unit electrodes are connected with each other through a connection portion positioned on the extending line of the stem part.

14. The liquid crystal display of claim 13, wherein the connection portion comprises:
- a first connection portion connecting end portions of the fine branch part positioned at lower and upper ends of the plurality of lower panel unit electrodes; and
- a second connection portion connecting end portions of the fine branch part positioned at right and left ends of the plurality of lower panel unit electrodes.

15. The liquid crystal display of claim 1, wherein:
- one pixel comprises a first subpixel and a second subpixel configured to display equal or different luminance for one input image signal;
- the first and second subpixels respectively comprise the lower panel electrode and the upper panel electrode; and
- the number of the lower panel unit electrodes forming the second subpixel is larger than the number of the lower panel unit electrodes forming the first subpixel.

16. The liquid crystal display of claim 1, wherein the liquid crystal layer is free of a hardened alignment aid to provide a pretilt.

17. The liquid crystal display of claim 1, further comprising:
- a first insulating substrate;
- a gate line and a data line positioned on the first insulating substrate and crossing each other while being insulated from each other; and
- a color filter positioned on the gate line and the data line.

18. The liquid crystal display of claim 17, wherein the lower panel electrode is positioned on the color filter, and comprises first and second subpixel electrodes disposed apart from each other with the gate line disposed therebetween.

19. The liquid crystal display of claim 18, wherein a maximum length of the fine branch part is about 53 μm.

* * * * *